United States Patent
Millman

[15] 3,657,572
[45] Apr. 18, 1972

[54] POWER CONVERTER WITH SELF-SYNCHRONIZATION AND BIAS

[72] Inventor: Sidney E. Millman, Van Nuys, Calif.
[73] Assignee: TRW Inc., Redondo Beach, Calif.

[22] Filed: Nov. 20, 1970
[21] Appl. No.: 91,335

[52] U.S. Cl. ..........307/297, 307/300
[51] Int. Cl. ..........H03k 1/14
[58] Field of Search ..........307/297, 300; 317/33

[56] References Cited

UNITED STATES PATENTS

| | | | |
|---|---|---|---|
| 3,354,378 | 11/1967 | Jewett | 317/33 |
| 3,426,266 | 2/1969 | Day et al. | 307/297 |
| 3,368,139 | 2/1968 | Wuerflein | 307/297 |
| 3,192,441 | 6/1965 | Wright | 307/297 |
| 3,235,787 | 2/1966 | Gordon | 307/297 |
| 3,364,392 | 1/1968 | Lafreniere | 317/33 |
| 3,548,294 | 12/1970 | Houghton | 307/297 |

*Primary Examiner*—Donald D. Forrer
*Assistant Examiner*—Harold A. Dixon
*Attorney*—Daniel T. Anderson, Alfons Valukonis and Harry I. Jacobs

[57] ABSTRACT

A power converter having a self-synchronized commutator that causes the power pass transistor in the converter to very rapidly assume its completely turned off state when converter power output is no longer desired. Also provided is apparatus for the converter which supplies base drive to the power pass transistor in response to a triggering pulse. The base drive apparatus has a feed back transistor bias circuit which includes a starting gate that allows the converter to operate during the first several cycles until bias by the bias circuit is provided.

12 Claims, 1 Drawing Figure

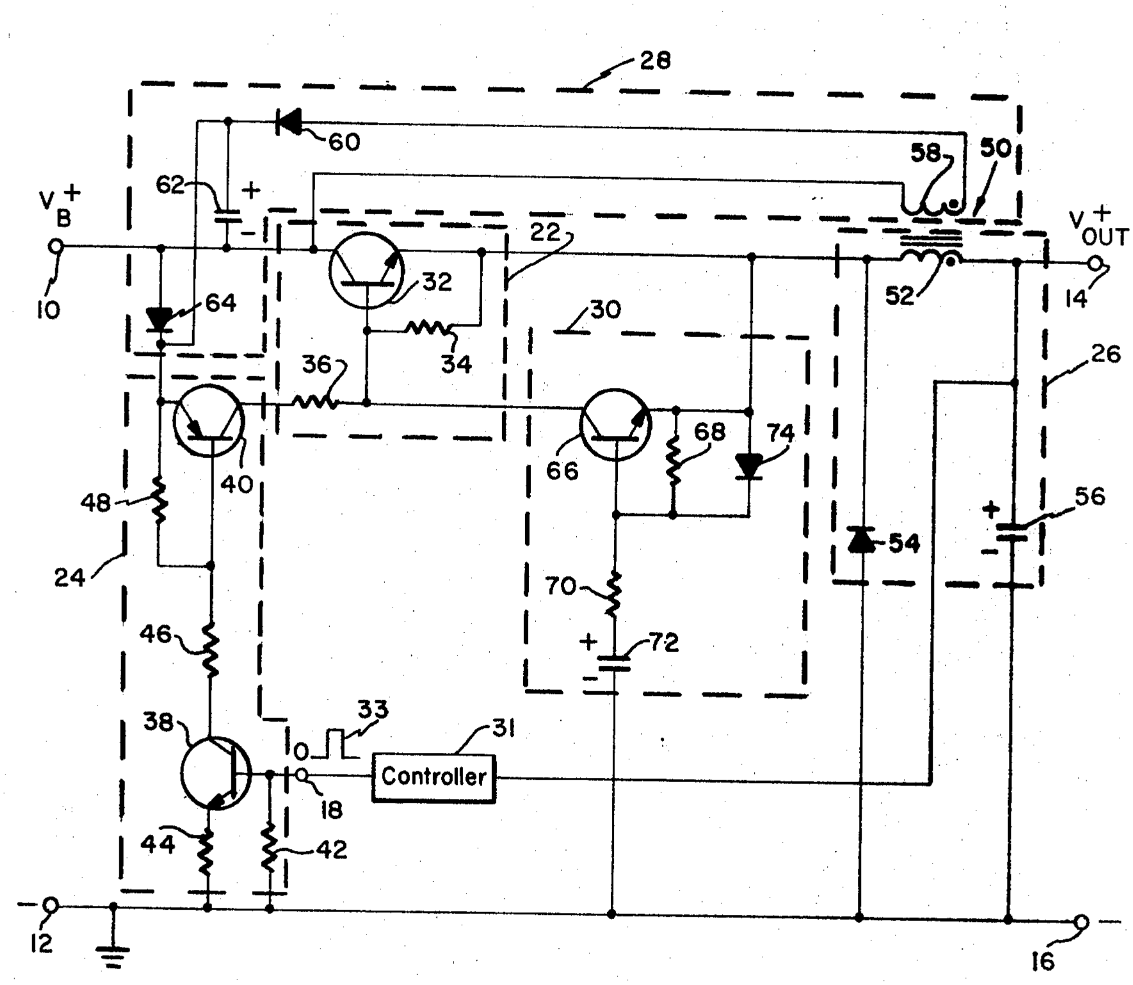
Sidney E. Millman
INVENTOR.
BY
Alfons Valukonis
AGENT

POWER CONVERTER WITH SELF-SYNCHRONIZATION AND BIAS

BACKGROUND OF THE INVENTION

1. Field of the Invention

This invention relates generally to power converters, and more particularly to a self-biased, self-synchronized power converter.

2. Description of the Prior Art

In power converters it is desirable to cause the power pass transistor to turn off as rapidly as possible during a typical chopping operation. In prior art devices this was usually accomplished with a pair of transistors in a push-pull arrangement connected to the base of the power pass transistor wherein the push transistor takes its power from a bias supply providing voltage higher than that of the power pass transistor base while the power pass transistor is turned on, and the pull transistor sinks either to ground or a negative voltage obtained from another bias supply network during turn-off of the power pass transistor. The push-pull arrangement is normally driven by a common signal from a control circuit. This push-pull arrangement presents a problem in that there is usually exhibited high transistor heat dissipation due to simultaneous conduction of the push-pull transistors during cross over from the "on" condition to the "off" condition, and synchronization or sequencing becomes very difficult. Additionally, in prior art converters more component parts are needed, and the frequency responses are limited.

The present invention reduces the fall time of the power pass transistor by a factor of the order of 50. Apparatus constructed in accordance with the invention reduced the fall time of the power transistor from 10 microseconds to .2 microseconds.

In addition, the present invention provides for a self-synchronized power converter having negligible transistor heat dissipation. Moreover bias voltages supplied by other circuits are not required. The converter is clamped for low voltage operation, which is approximately 1 volt. The number of parts in the converter is small, which lends itself to ready incorporation in integrated microcircuits. Also, the converter of the present invention provides greater linearity of response heretofore unobtainable with prior art converters.

SUMMARY OF THE INVENTION

Apparatus in which a transistor switch is connected to input and output terminals and response to base drive. Also provided is means connected to the output terminal and a common input-output terminal and the base of the transistor switch for pulling excess minority carriers out of the base of the transistor switch. According to another aspect of the invention there is provided means which generates base drive to the transistor switch in response to a triggering pulse.

BRIEF DESCRIPTION OF THE DRAWINGS

The sole FIGURE is a schematic showing of the power converter of the present invention.

DESCRIPTION OF THE PREFERRED EMBODIMENTS

Referring to the sole figure in the drawings, there is shown the power converter of the present invention as having a pair of input terminals 10 and 12, the terminal 10 adapted to be connected to a source (not shown) of input D.C. voltage $V_B+$, and the terminal 12 connected to the negative terminal or ground of the source of voltage. Also provided is a pair of output terminals 14 and 16, the terminal 14 providing the output D.C. voltage $V+_{OUT}$ and the output terminal 16 being in common connection with the input terminal 12 to thus provide a common input-output terminal. A control input terminal 18 for the reception of control pulses is also provided. The power converter further consists of power pass circuit 22, drive circuit 24, filter 26, bias circuit 28, commutator 30, and controller 31.

The power pass circuit 22 consists of a transistor 32, a resistor 34, and a resistor 36. The transistor 32 is of the NPN-type with its collector connected to the input terminal 10. The resistor 34 interconnects the base and emitter of the transistor 32 and serves as a by-pass resistor for the transistor. The resistor 36 has one end connected to the base of the transistor 32 and serves as a current limiting resistor which limits the maximum base drive available to the transistor 32.

The drive circuit 24 is provided with transistors 38 and The transistor 38 is of the NPN NON-type and has its base connected to the control input 18. The base of the transistor 38 is also connected through a resistor 42 to ground, which serves as a by-pass resistor for the transistor 38. A resistor 44 connects the emitter of transistor 38 to ground, and another resistor 46 connects the collector of transistor 38 to the base of transistor 40. Both resistors 44 and 46 are current limiting resistors which limit the maximum base drive current which can be drawn from the transistor 40. In addition transistor 40 has its collector connected to the resistor 36 and its emitter through a resistor 48 to its base. The transistor 40 is of the PNP-type.

The inductor 50 has a primary winding 52 connected as shown with the diode 54 and the capacitor 56 to constitute the reactive flyback filter circuit 28 which is capable of receiving square voltage pulses from the emitter of the transistor 32 to deliver low ripple output voltage $V+_{OUT}$ at the output terminals 14 and 16.

The bias circuit 28 has one end of secondary winding 58 of the inductor 50 connected to the collector of the transistor 32 and the other end connected through a rectifier diode 60 and a capacitor 62 to the collector of transistor 32. Additionally, there is provided a diode 64 which interconnects the input terminal 10 and the emitter of transistor 40. Also, provided is a connection between the emitter of transistor 40 and the interconnecting junction between the diode 60 and the capacitor 62.

The commutator circuit 30 is shown as having a transistor 66 with its collector connected to the base of the transistor 32 and its emitter connected to the emitter of transistor 32. Connected between the emitter of transistor 66 and its base is a resistor 68 which serves as a base emitter by-pass resistor and prevents the transistor from being turned on by its collector leakage current. A series arrangement of a resistor 70 and a capacitor 72 interconnects the base of the transistor 66 and ground. A diode 74 connected between the emitter of transistor 66 and its base complete the circuit of the commutator.

The controller 31 is connected between the output terminal 14 and the control input terminal 18 and provides in its output trigger pulses for actuating the drive circuit 24 in a predetermined manner. The controller 31 can be any conventional trigger pulse generator, such as a Schmitt trigger circuit, that is capable to sensing when the output voltage $V+_{OUT}$ has dropped below a predetermined value and generating a pulse 33 at the terminal 18, and of sensing when the output voltage $V+_{OUT}$ has risen above the predetermined value and removing the pulse 33 to apply zero voltage at the terminal 18.

Operation of the power converter of the sole figure in the drawings is as follows. Let it be assumed that the control cycle begins with all the transistors 32, 38, 40, and 66 turned off. The control circuit 31 detects that the output voltage at the output terminals 14 and 16 is low and accordingly transmits a positive pulse 33 to the base of the transistor 38 which causes it to turn on for the duration of the pulse. This in turn causes transistor 40 to turn on. When transistor 40 turns on, the voltage $V+_{DC}$ available at the input terminal 10 is applied through the diode 64 to the base of the transistor 32 to serve as base drive and to turn on the transistor 32.

While the transistor 32 is turned on, the capacitor 72 charges to the voltage $V+_B$ in the polarity indicated through the diode 74 and resistor 70. At the appropriate time when the voltage $V+_{OUT}$ at the output terminal rises above the predetermined value, the pulse 33, applied to the transistor 38 by the control circuit 31, is eliminated, and base drive is removed from the transistor 40 causing it to turn off and diminish base drive to the transistor 32. The transistor 32 then begins to turn off as the transistor 40 continues to decay off.

As the transistor 32 enters its fall time, the inductor 50 begins to fly back and the voltage at the emitter of transistor 32 starts to drop. When this voltage has fallen to approximately 1 volt, transistor 66 is turned on and begins to conduct due to the charge on the capacitor 72. This causes the transistor 66 to pull excess minority carriers out of the base of the transistor 32 which makes its emitter current fall even more rapidly. The inductor 50 then responds with a more negative voltage at the emitter of transistor 32, and the process regenerates until the emitter of transistor 32 is below ground by the forward voltage drop of the diode 54. The saturation voltage of the transistor 66 is significantly less than the forward base-emitter voltage of the transistor 32. Accordingly, the transistor 32 is effectively clamped off until the capacitor 72 discharges, thus permitting the transistor 66 to resume its turned-off state. Capacitor 72 and resistor 70 should be so chosen as to maintain transistor 66 fully turned on for a period sufficient to ensure that transistor 32 has fully recovered its turned off state. At the conclusion of this period, capacitor 72 should then be sufficiently discharged such that the current in resistor 70 is less than that required to maintain 66 fully turned on, thus allowing transistor 66 to recover its turned off state. The cycle repeats when the transistor 38 is again commanded "on" by a positive pulse 33 from the control circuit 31.

During the first several cycles of operation the diode 64 serves as a starting gate providing bias to the transistor 40 and permitting the power converter to operate until the capacitor 62 of the feed back bias circuit 28 has sufficient time to charge. Thus, everytime the transistor 32 is turned off, the inductor 50 acts as a source of voltage, and by means of the secondary winding 58 impresses a positive voltage at the anode of the diode 60 causing it to conduct and charge the capacitor 62 in the polarity shown. Accordingly, the secondary winding 58 acts with the rectifier diode 60 and capacitor 62 to provide a positive D.C. voltage bias for the transistor 40. When the capacitor 62 becomes fully charged after a few cycles of operation, the diode 64 becomes reversed biased and the capacitor 62 then becomes the source of D.C. voltage bias applied to the transistor 40, enabling the transistor 32 to be turned on as before described, but now by the base drive supplied from capacitor 62 and through transistor 40.

In summary, it will be appreciated that the transistor 40 is well in its turn-off state, if not completely off, when the transistor 66 is turned on. Moreover, as previously set forth, by the proper selection of the capacitor 72 and the resistor 70, the transistor 66 will have been turned off before the transistor 40 receives its next turn-on command. Accordingly, there is little or no simultaneous conduction of the transistor 40 and 66.

Furthermore, the transistor 66 receives its base drive information from the power pass circuit 22 and requires no synchronization or sequencing information from the control circuit 31. The voltage across transistor 66 is clamped to the forward base-emitter voltage of the transistor 32 (approximately 1.0 volt), and the reverse base-emitter voltage of transistor 66 is clamped to about one volt by the diode 74. Thus, because transistor 66 operates in a low voltage/low duty cycle mode its power dissipation is negligible.

Obviously many modifications and variations of this invention are possible in view of the above teachings. It is therefore to be understood that within the scope of the appended claims the invention may be practiced otherwise than as specifically claimed.

1. In a regulated power supply of the type having input and output terminals, a ground terminal, and a first transistor switch having its collector connected to said input terminal and its emitter connected to said output terminal and responsive to base drive, the improvement comprising:

a second transistor switch having its collector connected to the base of said first transistor switch, and its emitter connected in common with said emitter of said first transistor; and circuit means connected to said output terminal, ground terminal, and the base of said second transistor switch for providing base drive to said second transistor switch.

2. The improvement set forth in claim 1 wherein said circuit means comprises:

unidirectional current conducting means interconnecting said output terminal and the base of said second transistor switch; and a series combination of a capacitor and a resistor coupled between the base of said second transistor switch and said ground terminal.

3. The improvement of claim 2 wherein said unidirectional current conducting means comprises:

a diode.

4. In combination comprising:

input and output terminals;

a common input-output terminal;

a first NPN-transistor having a collector connected to said input terminal, and an emitter connected to said output terminal;

a second NPN-transistor having a collector connected to the base of said first transistor, and an emitter connected to said output terminal;

a diode interconnecting said output terminal and the base of said second transistor; and a series arrangement of a resistor and a capacitor interconnecting the base of said second transistor and said common input-output terminal.

5. In a regulated power supply of the type consisting of a switch power pass circuit, a drive circuit, a flyback averaging filter, and a controller, the improvement comprising:

a transistor switch connected between said power pass circuit and said filter;

a diode connected between emitter and base of said transistor switch; and a series combination of a capacitor and a resistor for providing base drive to said transistor.

6. In combination comprising:

input and output terminals;

a common input-output terminal;

an inductor having a primary winding;

an NPN-transistor having a collector connected to said input terminal, and an emitter connected through said primary winding to said output terminal;

a PNP transistor having a collector connected to the base of said NPN transistor;

a diode having an anode connected to said input terminal and a cathode connected to the emitter of said PNP-transistor; and A secondary winding on said inductor having one end directly connected to said input terminal and another end connected to said input terminal through a series arrangement of a unidirectional current conducting means and capacitor means, the interconnecting junction of said current conducting and capacitor means being connected to the emitter of said p-n-p transistor.

7. In combination comprising:

input and output terminals;

a common input-output terminal;

an inductor having primary and secondary windings;

a transistor switch connected to said input terminal through said primary winding to said output terminal and responsive to base drive;

means connected to said output terminal, common input-output terminal, and the base of said transistor switch for pulling excess minority carriers out of the base of said transistor switch;

means coupled to said input terminal, common input-output terminal, primary winding and the base of said transistor switch for providing base drive to said transistor switch in response to a triggering pulse;

means coupled to said secondary winding for providing regulated bias voltage; and means for adding the regulated bias voltage to said input; so that base drive is provided for said transistor switch.

8. In combination comprising:

input and output terminals;

a common input-output terminal;

an inductor having a primary winding;

a transistor switch connected to said input terminal and through said primary winding to said output terminal and responsive to base drive; and means providing base drive to said transistor switch in response to a triggering pulse comprising;

another transistor switch connected to said input terminal and the base of said one transistor switch and responsive to base drive, and a secondary winding on said inductor having one end directly connected to said input terminal and another end connected to said input terminal through a series arrangement of a unidirectional current conducting means and capacitor means, the interconnecting junction of said current conducting and capacitor means being connected to the emitter of said other transistor switch.

9. The combination set forth in claim 8 wherein said transistor switch comprises:

an NPN-transistor having a collector connected to said input terminal, and an emitter connected through said primary winding to said output terminal.

10. The combination set forth in claim 8 wherein said other transistor switch comprises:

a PNP-transistor having a collector connected to the base of said one transistor switch and an emitter connected to said input terminal.

11. The combination set forth in claim 10 wherein said emitter is connected to said input terminal by a unidirectional current conducting means.

12. The combination set forth in claim 11 wherein said unidirectional current conducting means comprises:

a diode having a anode connected to said input terminal and a cathode connected to said emitter.

* * * * *

UNITED STATES PATENT OFFICE

CERTIFICATE OF CORRECTION

Patent No. 3,657,572 Dated April 18, 1972

Inventor(s) Sidney E. Millman

It is certified that error appears in the above-identified patent and that said Letters Patent are hereby corrected as shown below:

Column 2, line 10 "transistors 38" should read -- transistors 38 and 40--

Column 2, line 25 "circuit 28" should read -- circuit 26--

Signed and sealed this 5th day of December 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334